Nov. 16, 1965     D. R. CULLIMORE ETAL     3,218,240
DEVICE AND METHOD FOR TESTING MINERAL DEFICIENCIES IN SOIL
Filed Jan. 31, 1963
FIG.I.
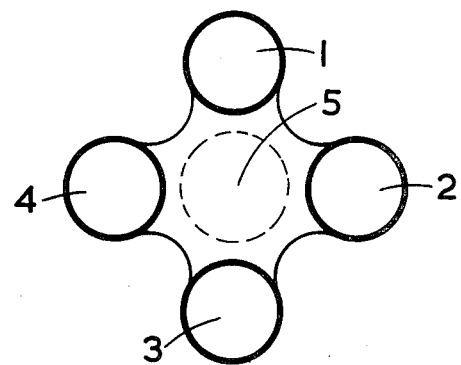
FIG.2.
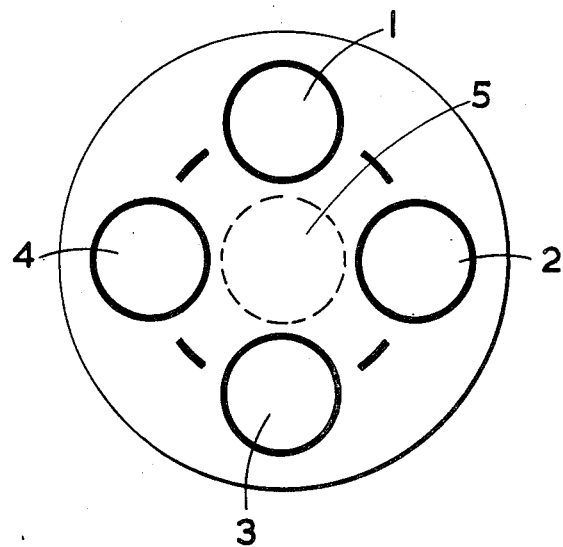

United States Patent Office 3,218,240
Patented Nov. 16, 1965

3,218,240
DEVICE AND METHOD FOR TESTING MINERAL DEFICIENCIES IN SOIL
Denis Roy Cullimore, London, and Malcolm Woodbine, Kegworth, England, assignors to National Research Development Corporation, London, England, a British corporation
Filed Jan. 31, 1963, Ser. No. 255,284
Claims priority, application Great Britain, Feb. 2, 1962, 4,105/62
12 Claims. (Cl. 195—103.5)

The present invention relates to devices for testing mineral deficiencies.

In soil, the presence of potassium, nitrogen and phosphorus in adequate proportions together with traces of iron, copper, manganese, magnesium, aluminium, zinc, molybdenum and boron is essential to satisfactory plant growth, and where a deficiency exists in respect of any one of these elements plant growth can be improved by the addition of a compound containing that element to the soil. It is therefore of importance to have available a means of testing a sample of soil to ascertain whether or not there is in fact a deficiency of any of these elements in it.

Hitherto, no such means of testing which can be easily and quickly carried out has been available. Indeed there is no simple test at all at the moment for estimating available nitrogen in the soil. The object of the present invention is to provide a device which does enable a test for potassium, nitrogen and phosphorus or for trace elements to be carried out easily and relatively quickly.

It has now been discovered that soil algae can be used as indicators of subsequent plant growth in soil. Thus, soil algae will only grow in the presence of adequate proportions of phosphorus, nitrogen and potassium salts and trace elements, and a study of the growth of soil algae will therefore serve to indicate whether or not the soil has a mineral deficiency. If the soil algae fail to grow, then a deficiency exists and, by making phosphorus, nitrogen and potassium or trace elements available in different combinations to the algae it is possible to discover where the deficiency lies. The present invention provides a device which is particularly convenient for carrying out such a test.

According to the present invention therefore, there is provided a device for testing mineral deficiencies in soil comprising a plurality of isolated zones of absorbent material, each zone carrying soil algae and a proportion of at least one nutritional compound selected from phosphorus, nitrogen and potassium compounds, each zone having a different nutritional capacity with respect to soil algae.

By the term "isolated zones" is meant zones which are separated so that the compounds carried by the zone are prevented from migrating to another zone when the material is wet.

A preferred form of the device comprises four such zones in which the first zone, the control zone, carries phosphorus, nitrogen and potassium containing compounds and the other three zones each carry phosphorus and nitrogen containing compounds, phosphorus and potassium containing compounds and nitrogen and potassium containing compounds respectively.

The device may be in the form of individual pieces of absorbent material, such as filter paper, each piece carrying the algae and the various nutritional compounds. For ease of handling however, it is preferred that the isolated zones are integral and a preferred form of the device is in the form of a flat sheet having a non-absorbent central zone and a plurality of absorbent peninsula zones as illustrated in FIG. 1 of the accompanying drawing in which zones 1, 2, 3 and 4 carry the algae and nutritional compounds and zone 5 is the non-absorbent central zone. An alternative design for the disc is shown in FIG. 2 of the accompanying drawing in which the absorbent zones 1, 2, 3 and 4 are encircled with an impermeable edging to isolate them from one another and from the central zone 5.

A device such as that illustrated may conveniently be constructed from filter paper and the central area rendered non-absorbent by impregnation with a silicone or polythene. Impregnation of the central area in this manner is advantageous since the migration of nutritional compounds from one zone to another is inhibited. Such migration from zone to zone and outwardly from a zone when the device is in use may also be inhibited by encircling the absorbent zones with an impermeable edging of wax.

The nutritional compounds carried by the devices of the invention are those which are available for algal growth and are preferably water soluble. As phosphorus source, the most convenient compounds are calcium superphosphate, sodium dihydrogen phosphate, triple phosphate or rock phosphate while potassium may be introduced in the form of frit or potassium sulphate. The nitrogen is best introduced in the form of an ammonium salt such as the sulphate or as calcium cyanamide which has a low solubility coupled with a good availability.

The trace elements may be introduced, when desired, in the form of their simple salts or complexes such as iron E.D.T.A. complex, copper sulphate, manganese chloride, magnesium sulphate, aluminium sulphate, zinc sulphate, sodium molybdate and ortho boric acid.

The algae carried by the devices of the invention may be any of those normally found in soil such as *Chlorella vulgaris, Stichococcus bacillaris, Hormidium flaccidum* or *Plectonema sp.* and are used in an amount such that their growth can be easily observed with the naked eye. Such a concentration is normally in the range of about $10 \times 10^4$ to $10 \times 10^6$ algal cells/sq. cm. of the absorbent zone.

The concentration of the nutritional compounds in the absorbent zones are normally selected so that one zone contains a sufficient concentration of phosphorus, nitrogen and potassium to permit algal growth and so acts as a control zone while the other zones are deficient in at least one of the elements and require the presence of these deficient elements in the soil to permit algal growth.

The concentrations in parts per million of phosphorus, nitrogen and potassium in normal and deficient soils are shown in the following table.

| Soil type | Phosphorus | Nitrogen | Potassium |
|---|---|---|---|
| Adequate | 14–25 | 27–50 | 36–70 |
| Deficient | 9–13 | 3–26 | 7–35 |
| Very deficient | 0– 8 | 0– 2 | 0– 6 |

The concentration of the nutritional compounds is therefore selected with these concentrations in mind and are most frequently in the range 0.025–0.03 mg. phosphorus/sq. cm., 0.05–0.10 mg. nitrogen/sq. cm., and 0.075–0.15 mg. potassium/sq. cm., the concentrations referring to mg. per sq. cm. of absorbent zone. It is often desirable for the device to carry trace elements so that a trace element deficiency in the soil can be determined or so that, when soil is being tested for phosphorus, nitrogen or potassium deficiency, the algal growth will not be affected by incidental trace element deficiency in the soil. When the device is to carry trace elements they may be introduced in such amounts as to give a concentration of about 5 μg./sq. cm. of iron, about 3 μg./sq. cm. of copper, manganese and magnesium and about 1 μg./sq. cm. of aluminium, zinc, molybdenum and boron.

The algae carried by the device may be introduced for example by surface impregnation, producing a high algal concentration on one surface of the device, by soaked impregnation, producing a high algal concentration on both surfaces of the device or by filtered impregnation, producing a regular distribution of algae throughout the device.

The nutritional compounds carried by the device may conveniently be introduced by impregnating the device with an aqueous solution of the appropriate compounds or by adding the compounds as a concentrate to the centre of the zone and then drying the device. Both impregnations can be carried out simultaneously but to minimise osmotic effects on the algal cells it may be preferred first to impregnate the device with the nutritional compounds and then to impregnate the device with the algae. The nutritional compounds may also be introduced using plastic pellets impregnated with the compounds and from which the nutritional compounds are slowly released. Such pellets may be supported on the absorbent zones and the nutritional compounds absorbed onto the material as they are released from the pellet.

The device may be used to test for mineral deficiencies in soil by contacting a sample of the soil with the device for a time sufficient to permit observable growth of the algae and observing the intensity of algal growth in the various zones.

The following example describes the preparation and use of a device in accordance with the invention.

*Example*

A piece of Whatman No. 542 acid washed filter paper having a central zone and four extending peninsula zones as shown in FIG. 1 of the accompanying drawing, is used. The zone 1 is impregnated with calcium superphosphate (19% $P_2O_5$) at a concentration of 0.3 mg./sq. cm., potassium sulphate at a concentration of 0.02 mg./sq. cm., and ammonium sulphate at a concentration of 0.0725 mg./sq. cm. Zones 2, 3 and 4 are impregnated with the same concentrations of calcium superphosphate and potassium sulphate, calcium superphosphate and ammonium sulphate and ammonium and potassium sulphates respectively. Zone 5 is impregnated with B.D.H. "Repelcoat," a water-repellant silicone dissolved in carbon tetrachloride. The dried disc is then impregnated with the soil algae such as *Chlorella vulgaris*.

The discs thus prepared may be stored for up to 12 months or even longer without the algae losing their viability provided that the discs are kept in a dry place.

To carry out a test using the device a sample of soil (20–30 g.) is saturated with water to a mud-like consistency. The device is laid flat on top of the soil, covered with glass and left at room temperature in the presence of artificial light or indirect sunlight for a period of 3–6 days. At the end of this period zone 1 containing phosphorus, nitrogen and potassium will have turned green indicating the growth of algae. Zone 2 will also have turned the same shade of green unless there is a deficiency of nitrogen in the soil and failure of zone 2 to turn the same shade of green indicates such a deficiency. When a deficiency exists, the extent of the deficiency can be roughly estimated by the degree of difference in colour between the zones. This can be determined by eye or by using a reflectometer. Similarly, zones 3 and 4 will have turned the same shade of green unless deficiencies of potassium and phosphorus respectively exist.

The test as described above is essentially qualitative but quantitative tests can also be carried out using the devices of the invention. Thus, once having determined that, for example, a phosphorus deficiency exists, a device similar to that shown in the drawing but in which zones 1, 2, 3 and 4 contain 0.3, 0.2, 0.1 and 0.05 mg./sq. cm. respectively of calcium superphosphate in addition to the ammonium and potassium sulphates could be used to carry out a second test. Should, for instance, only zones 1 and 2 turn green this would mean that 0.2 mg./sq. cm. of superphosphate is sufficient to make good the deficiency whilst 0.1 mg./sq. cm. is not. Thus, a quantitative indication of the deficiency is provided.

The devices of the invention may be modified by providing an additional isolated absorbent zone impregnated with a pH indicator undergoing a colour change in the pH range 5 to 8. Suitable indicators include bromocresol purple, bromocresol green, B.D.H. "678" and B.D.H. "4460." It is preferred that the indicator zone is not impregnated with algae as the algae tend to mask the colour of the indicator. It is thus possible, by using the devices modified by the provision of pH indicator to assess the lime requirements of the soil as well as the phosphorus, nitrogen and potassium requirements by making a single test.

It has been further found that the devices of this invention may be further modified by replacing the soil algae by a mould such as *Aspergillus niger* whose nutritional requirements are similar to soil algae. *Aspergillus niger* does not, of course, photosynthesise as do soil algae and it is therefore necessary to impregnate the device with a source of assimilable carbon as well as the mould, so that the mould will grow in the presence of adequate amounts of phosphorus, nitrogen and potassium. The growth of *Aspergillus niger* can be observed with the naked eye as can that of the algae and the invention includes devices modified by the replacement of the soil algae by *Aspergillus niger* and a source of assimilable carbon.

We claim:

1. A device for testing mineral deficiencies in soil comprising a plurality of isolated zones of absorbent material, each zone carrying (1) a viable material selected from the group consisting of (a) soil algae and (b) *Aspergillus niger* in association with a source of assimilable carbon and (2) a proportion of at least one nutritional compound available for growth of said viable material selected from the group consisting of compounds containing phosphorus available for such growth, compounds containing nitrogen available for such growth and compounds containing potassium available for such growth, each zone having a different nutritional capacity with respect to such viable material.

2. A device according to claim 1 comprising four isolated zones, the first zone carrying available nitrogen, available phosphorus and available potassium containing compounds, the second zone carrying available phosphorus and available potassium containing compounds, the third zone carrying available phosphorus and available nitrogen containing compounds and the fourth zone carrying available nitrogen and available potassium containing compounds.

3. A device according to claim 1 in which the compound containing available phosphorus is selected from the group consisting of calcium superphosphate, triple phosphate, rock phosphate and sodium dihydrogen phosphate, the compound containing available nitrogen is selected from the group consisting of ammonium sulphate and calcium cyanamide and the compound containing available potassium is selected from the group consisting of potassium sulphate and frit.

4. A device according to claim 1 in which the absorbent zones also carry at least one available trace element selected from the group consisting of iron, copper, manganese, magnesium, aluminium, zinc, molybdenum and boron.

5. A device according to claim 1 in which the viable material is a soil algae selected from the group consisting of *Chlorella vulgaris*, *Stichococcus bacillaris*, *Hormodium flaccidum* or *Plectonema* sp.

6. A device according to claim 1 in which the absorbent material is paper.

7. A device according to claim 1 in which the absorbent zones are impregnated with the nutritional compounds and soil algae.

8. A device according to claim 1 containing an additional absorbent zone impregnated with a pH indicator undergoing a colour change in the pH range 5–8.

9. A method of testing for mineral deficiency in soil comprising contacting a sample of the soil with a device claimed in claim 1 for a time sufficient to permit observable growth of the viable material and observing the intensity of growth in the various zones.

10. A device for testing mineral deficiencies in soil comprising a substantially flat sheet of paper having a non-absorbent central zone and four absorbent peninsular zones extending outwardly from the outer periphery of the central zone in which the first of the said peninsular zones is impregnated with nutritional compounds containing phosphorus, potassium and nitrogen available for algal growth, the second of said peninsular zones is impregnated with nutritional compounds containing phosphorus and potassium available for algal growth, the third of said peninsular zones is impregnated with nutritional compounds containing potassium and nitrogen available for algal growth and the fourth of said peninsular zones is impregnated with nutritional compounds containing phosphorus and nitrogen available for algal growth and in which all four of said peninsular zones are impregnated with soil algae.

11. A device for testing mineral deficiencies in soil comprising a plurality of isolated zones of absorbent material, the zones carrying *Aspergillus niger,* a source of assimilable carbon and a proportion of at least one nutritional compound available for fungal growth selected from the group consisting of compounds containing available potassium, compounds containing available nitrogen and compounds containing available phosphorus, each zone having a different nutritional capacity with respect to *Aspergillus niger.*

12. A device for testing the level of mineral deficiency in soil comprising a plurality of isolated zones of absorbent material in which the zones are impregnated with soil algae and with differing concentrations of at least one nutritional compound available for algal growth selected from the group consisting of compounds containing available phosphorus, compounds containing available nitrogen and compounds containing available potassium.

References Cited by the Examiner

Journal of Cellular and Comparative Physiologoy, vol. 21, No. 3, pages 327–338, June 1943.

Journal of Science of Food and Agriculture, vol. 1, No. 11, pages 339–344, November 1950.

A. LOUIS MONACELL, *Primary Examiner.*

ABRAHAM H. WINKELSTEIN, *Examiner.*